United States Patent
Adachi et al.

(10) Patent No.: US 10,964,957 B2
(45) Date of Patent: Mar. 30, 2021

(54) MANUFACTURING METHOD FOR FUEL CELL INCLUDING A HEAT ADHESION STEP

(71) Applicant: TOYOTA JIDOSHA KABUSHIKI KAISHA, Toyota (JP)

(72) Inventors: Makoto Adachi, Nagakute (JP); Kazuo Shobu, Toyota (JP); Tomoyuki Soda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/207,493

(22) Filed: Dec. 3, 2018

(65) Prior Publication Data

US 2019/0173105 A1    Jun. 6, 2019

(30) Foreign Application Priority Data

Dec. 5, 2017 (JP) .............................. JP2017-233486

(51) Int. Cl.
- *H01M 8/0273* (2016.01)
- *H01M 8/0286* (2016.01)
- *H01M 8/0206* (2016.01)
- *H01M 8/0284* (2016.01)
- *H01M 8/1004* (2016.01)

(52) U.S. Cl.
CPC ....... *H01M 8/0273* (2013.01); *H01M 8/0206* (2013.01); *H01M 8/0284* (2013.01); *H01M 8/0286* (2013.01); *H01M 8/1004* (2013.01)

(58) Field of Classification Search
None
See application file for complete search history.

(56) References Cited

U.S. PATENT DOCUMENTS

2016/0260993 A1    9/2016    Ikeda

FOREIGN PATENT DOCUMENTS

| JP | 2011-096426 A | 5/2011 |
| JP | 2016-162651 A | 9/2016 |

OTHER PUBLICATIONS

JP2011096426 english translation (Year: 2011).*

\* cited by examiner

*Primary Examiner* — Lucas J. O'Donnell
(74) *Attorney, Agent, or Firm* — Hunton Andrews Kurth LLP

(57) ABSTRACT

The disclosure provides a manufacturing method for a fuel cell. The method includes a heating adhesion step in which a separator and a resin frame are adhered to each other. The heating adhesion step includes a plurality of heating steps in which a laminate is heated, and a conveyance step in which the laminate is conveyed between the heating steps. In the conveyance step, a support portion having a projecting portion projecting towards the laminate is used, and the laminate is supported only by the projecting portion and conveyed.

6 Claims, 3 Drawing Sheets

MANUFACTURING METHOD FOR FUEL CELL INCLUDING A HEAT ADHESION STEP

INCORPORATION BY REFERENCE

The disclosure of Japanese Patent Application No. 2017-233486 filed on Dec. 5, 2017 including the specification, drawings and abstract is incorporated herein by reference in its entirety.

BACKGROUND

1. Technical Field

The disclosure relates to a manufacturing method for a fuel cell.

2. Description of Related Art

A manufacturing method for a single fuel cell is known (see Japanese Unexamined Patent Application Publication No. 2016-162651 (JP 2016-162651 A) below). The disclosure described in JP 2016-162651 A provides a manufacturing method for a single fuel cell having a configuration described below in view of a demand for a technique that makes a large tensile load less likely to be applied to a membrane electrode assembly even when metal is used as a material for separators and polymer is used as a material for a support frame.

The single fuel cell includes the membrane electrode assembly, gas diffusion layers, the support frame, and the separators. In the membrane electrode assembly, electrode catalyst layers are formed on both sides of an electrolyte film, respectively. The gas diffusion layers are disposed on both sides of the membrane electrode assembly, respectively. The support frame supports the membrane electrode assembly at an outer periphery of the membrane electrode assembly. Each of the separators is disposed on side surfaces of the support frame and the gas diffusion layer on each side so that a peripheral edge of each of the separators is fixed to the support frame, and a center portion of each of the separators comes into contact with the gas diffusion layer. Further, the support frame includes a support frame body, and an adhesive coating layer made of a thermoplastic adhesive on at least one of both side surfaces of the support frame body. Also, the separators are made of metal, and the support frame body is made of extended crystalline polymer.

The manufacturing method for a single fuel cell described in JP 2016-162651 A is provided with the following next steps:

a first step in which a membrane electrode assembly is prepared, the membrane electrode assembly having gas diffusion layers disposed on both side surfaces of the membrane electrode assembly, respectively, while making an outer peripheral edge of one of the gas diffusion layers remain on one of the side surfaces of the membrane electrode assembly;

a second step in which an adhesive layer is formed so as to cover the outer peripheral edge of the gas diffusion layer;

a third step in which an inner portion of the support frame is disposed on the adhesive layer, and the support frame and the membrane electrode assembly are adhered to each other; and a fourth step in which peripheral edges of the separators are respectively disposed on both side surfaces of an outer portion of the support frame that is adhered to the membrane electrode assembly, and the support frame and the separators are heated and adhered to each other.

SUMMARY

In the manufacturing method for a single fuel cell described in JP 2016-162651 A, there are instances where working time (takt time) for the fourth step, in other words, working time for a step where the support frame and the separators are heated and adhered to each other, becomes longer than working time for each of the rest of the steps. In that case, time to wait for a workpiece happens in each of the rest of the steps in a manufacturing line.

Also, in order to avoid the waiting time in the rest of the steps, the fourth step is divided into two steps or more. Then, it becomes necessary to convey a fuel cell between the divided steps when adhesion of the support frame and the separators is not yet finished. While the unfinished fuel cell is being conveyed, when temperature of the support frame and the separators decreases, adhesion failure between the support frame and the separators can happen.

Therefore, the disclosure provides a manufacturing method for a fuel cell in which adhesion failure between a resin frame and a separator is restrained even when a step of heating and adhering the resin frame and the separator is divided into two steps or more.

An aspect of the disclosure relates to a manufacturing method for a fuel cell. The method includes a heating adhesion step in which a laminate is heated and a pair of separators and a resin frame are adhered to each other. In the laminate, a membrane-electrode-gas diffusion layer assembly and the resin frame surrounding the membrane-electrode-gas diffusion layer assembly are disposed between the separators. The heating adhesion step includes a plurality of heating steps in which the laminate is heated, and a conveyance step in which the laminate is conveyed between the heating steps. In the conveyance step, a support portion having a projecting portion projecting towards the laminate is used, and the laminate is supported only by the projecting portion and conveyed.

As described earlier, in the manufacturing method for a fuel cell according to the aspect, the heating adhesion step includes more than one heating steps. Therefore, even when working time for each of the steps included in the manufacturing method for a fuel cell other than the heating adhesion step is shorter than working time for the heating adhesion step, it is possible to make working time for each of the heating steps equal to the working time for each of the other steps. Therefore, in the manufacturing method for a fuel cell, even when working time for the heating adhesion step is longer than working time for each of the steps other than the heating adhesion step, it is possible to prevent waiting time from happening in each of the steps other than the heating adhesion step.

Further, as described above, the manufacturing method for a fuel cell according to the aspect has the conveyance step in which the laminate is conveyed between the heating steps. When the laminate is conveyed in the conveyance step between the heating steps, adhesion failure between the separator and the resin frame due to a temperature decrease of the laminate becomes an issue. In order to address the issue, as described earlier, in the conveyance step of the manufacturing method for a fuel cell according to the aspect, the support portion having the projecting portion projecting towards the laminate is used, and the laminate is supported only by the projecting portion and conveyed.

Thus, in the conveyance step, the support portion that supports the laminate, and the laminate supported by the support portion are in contact with each other only through a distal end of the projecting portion projecting towards the laminate from the support portion. Therefore, a contact area between the support portion and the laminate is minimized, and transfer of heat of the laminate to the support portion is restrained. Thus, it is possible to restrain a temperature decrease of the laminate. Hence, it becomes possible to restrain adhesion failure between the separator and the resin frame due to a temperature decrease of the laminate.

According to the aspect of the disclosure, a manufacturing method for a fuel cell is provided in which adhesion failure between the resin frame and the separator is restrained even when the step of heating and adhering the resin frame and the separator is divided into two steps or more.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of a manufacturing method for a fuel cell according to the disclosure is described with reference to the drawings.

Figure 1:
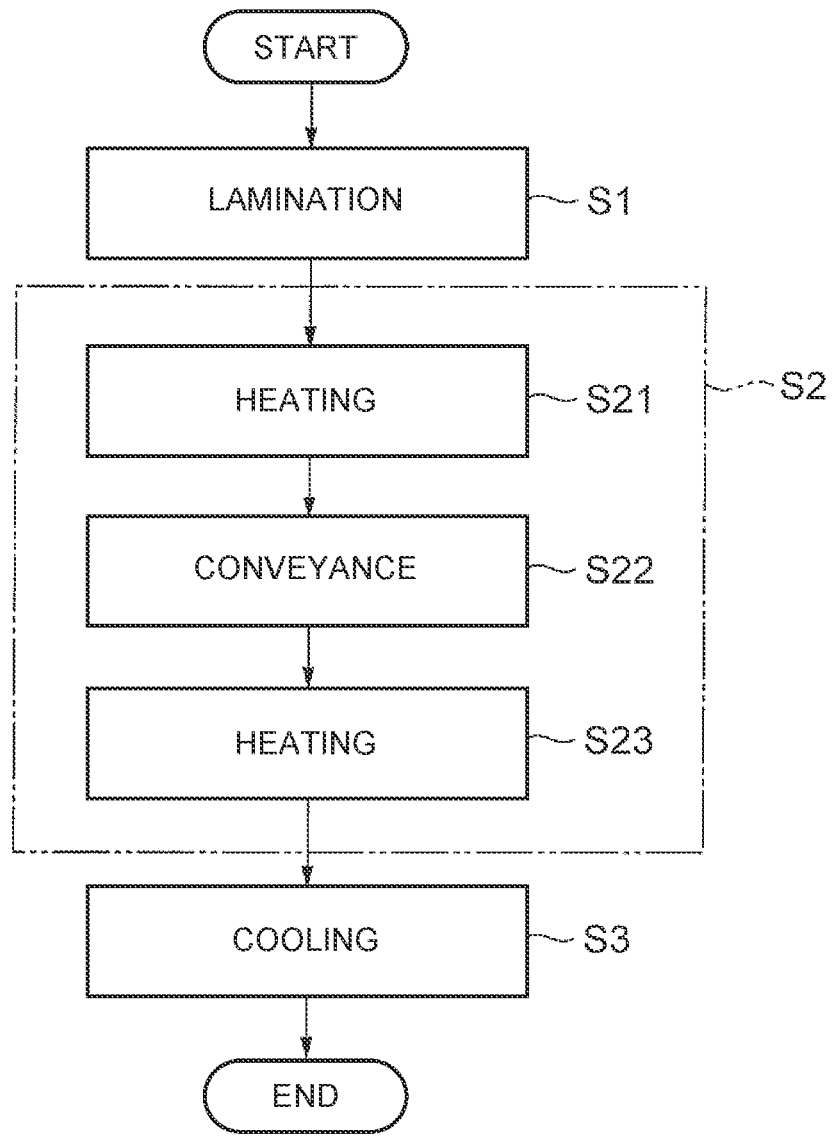
FIG. 1 is a flowchart of a manufacturing method for a fuel cell according to an embodiment of the disclosure.

FIG. 1 is a flowchart of a manufacturing method for a fuel cell according to an embodiment of the disclosure. The manufacturing method for a fuel cell according to the embodiment includes, for example, a manufacturing method for a fuel cell that includes, for example, a pair of separators 11, a membrane-electrode-gas diffusion layer assembly (MEGA) 12, and a resin frame 13 (see FIG. 2). The manufacturing method for a fuel cell according to the embodiment includes, for example, a lamination step S1, a heating adhesion step S2, and a cooling step S3.

The lamination step S1 is a step in which the MEGA 12 and the resin frame 13 surrounding the MEGA 12 are deposed between the separators 11 so as to configure a laminate 10. The MEGA 12 is made by, for example, laminating a catalyst layer (CL), a micro porous layer (MPL), and a gas diffusion layer (GDL) on each of front and back of a polymer electrolyte membrane (PEM).

Each of the separators 11 is a rectangular plate-shaped member with sufficient gas impermeability. The separators 11 form reactant gas flow passages on the front and the back of the MEGA 12 in each of the fuel cells, respectively. When a fuel cell stack is configured by laminating a plurality of fuel cells 1, each of the separators 11 forms a coolant flow passage between the neighboring fuel cells 1. In both end portions of each of the separators 11, there is a plurality of manifold holes 11b, 11c, 11d, 11e, 11f, 11g. The manifold holes 11b, 11c, 11d, 11e, 11f, 11g configure a manifold for feeding and discharging the reactant gas and the coolant.

A material of the separator 11 may be, for example, a thin metal plate made of stainless steel. When the material of the separator 11 is a thin metal plate, the separator 11 can be formed by pressing, and manufacturing steps are thus simplified and shortened. Therefore, productivity is improved, and an increase in manufacturing cost is suppressed.

The resin frame 13 is formed into a frame shape that surrounds the MEGA 12 by, for example, punching a flexible film-shaped resin sheet that contains heat-weldable thermoplastic resin at least on a surface of the resin sheet. The resin frame 13 has a rectangular frame shape corresponding to the shape of the separator 11, and also has a central opening 13a in the center where the MEGA 12 is disposed. Also, in both end portions of the resin frame 13 across the central opening 13a, there is a plurality of manifold openings 13b, 13c, 13d, 13e, 13f, 13g.

The manifold openings 13b, 13c, 13d, 13e, 13f, 13g of the resin frame 13 are made at positions corresponding to the manifold holes 11b, 11c, 11d, 11e, 11f, 11g of the separator 11, respectively. The manifold openings 13b, 13c, 13d, 13e, 13f, 13g configure the manifold for feeding and discharging the reactant gas and the coolant. The resin frame 13 has a slit-shaped flow passage (not shown) between the manifold openings 13b, 13d, 13e, 13g for feeding and discharging the reactant gas, and the central opening 13a, for example. The slit-shaped flow passage is formed in order to communicate the reactant gas flow passage between the separators 11, and the manifold.

In the lamination step S1, for example, one of the separators 11 is disposed almost horizontally, and the MEGA 12 and the resin frame 13 surrounding the MEGA 12 are disposed on top of the separator 11. On top of that, the other separator 11 is disposed, thereby configuring the laminate 10. After the lamination step S1 is finished, the heating adhesion step S2 is carried out as shown in FIG. 1.

The heating adhesion step S2 is a step where the laminate 10 in which the MEGA 12 and the resin frame 13 surrounding the MEGA 12 are disposed between the separators 11 is heated, and the separators 11 and the resin frame 13 are adhered to each other. In the manufacturing method for a fuel cell according to the embodiment, the heating adhesion step S2 includes a plurality of heating steps S21, S23 for heating the laminate 10, and a conveyance step S22 in which the laminate 10 is conveyed between the heating steps S21, S23.

In the manufacturing method for a fuel cell according to the embodiment, the heating adhesion step S2 has the two-stage heating steps S21, S23. The heating adhesion step S2 is not limited to two stages, and may have three-stage heating steps or more. In the manufacturing method for a fuel cell according to the embodiment, each of the heating steps S21, S23 is, for example, a hot press step in which pressing of a peripheral edge of the laminate 10 is performed.

As described above, by dividing the heating adhesion step S2 into the heating steps S21, S23, even when working time for the heating adhesion step S2 is longer than working time for each of the steps other than the heating adhesion step S2, working time for each of the heating steps S21, S23 can be equal to the working time for each of the steps other than the heating adhesion step S2. It is thus possible to prevent waiting time in each of the steps other than the heating adhesion step S2 caused by the heating adhesion step S2, thereby improving productivity of the fuel cell 1.

Also, in the manufacturing method for a fuel cell according to the embodiment, the first heating step S21 is, for example, a preheating pressing step in which the laminate 10 is preheated, and the second heating step S23 is, for example, a hot press step in which the laminate 10 is heated at temperature lower than that in the preheating pressing step. Working time for each of the first heating step S21 and the second heating step S23 is almost equal to, for example, working time for each of the lamination step S1, the conveyance step S22, and the cooling step S3. The working time for each of the steps is, for example, about two seconds.

In the first heating step S21, the laminate 10 is heated to temperature of, for example, 190° C. or higher but not exceeding 200° C. In the second heating step S23, the laminate 10 is heated to temperature of, for example, 170° C. or higher but not exceeding 190° C. In the manufacturing method for a fuel cell according to the embodiment, the conveyance step S22 is performed between the first heating step S21 and the second heating step S23.

Effects of the embodiment are described in a specific example. When, for example, the heating adhesion step takes four seconds and is not divided into more than one heating step, and the cooling step takes two seconds, then waiting time for two seconds happens in the cooling step in the heating adhesion step. However, in the embodiment of the disclosure, the heating adhesion step S2 is divided into the two second-long heating step S21 and the two second-long heating step S23. Therefore, the heating step S21, the heating step S23, and the cooling step S3 have equal working time (two seconds), and each of the steps is performed without waiting time. In the embodiment, the conveyance step S22 is carried out between the heating step S21 and the heating step S23. Therefore, temperature of the laminate 10 may be decreased during the conveyance step S22. Hence, in the embodiment, each support portion 20 of a palette 30 that conveys the laminate 10 has a shape described below.

Figure 2:
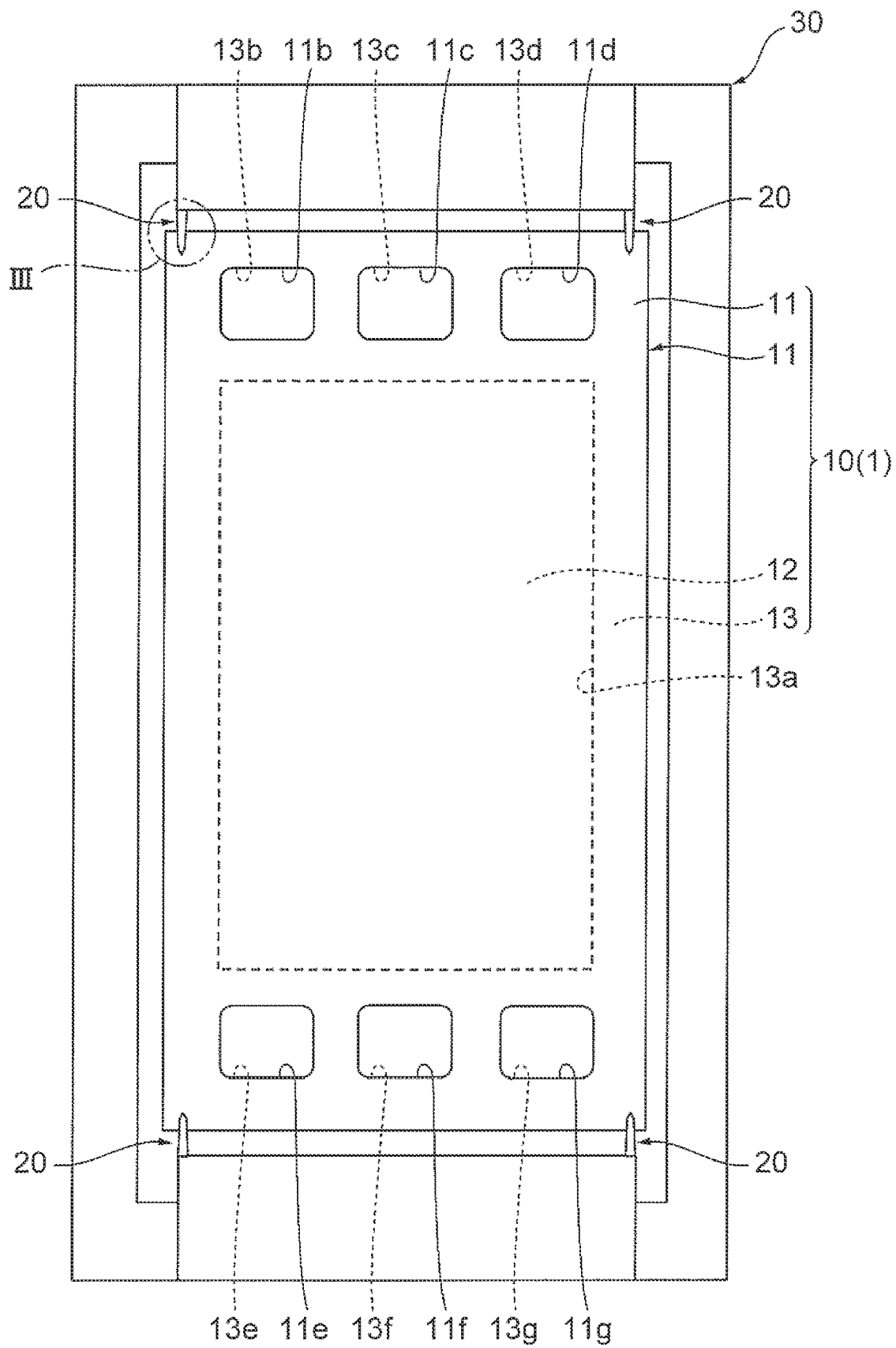
FIG. 2 is a plan view of a laminate in a conveyance step shown in FIG. 1.
Figure 3:
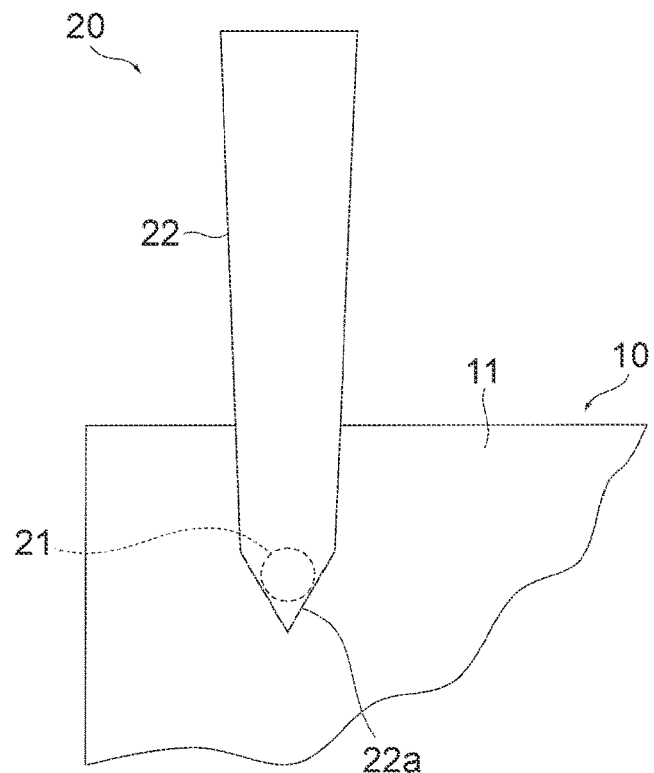
FIG. 3 is an enlarged plan view of a portion III surrounded by a two-dot chain line in FIG. 2.
Figure 4:
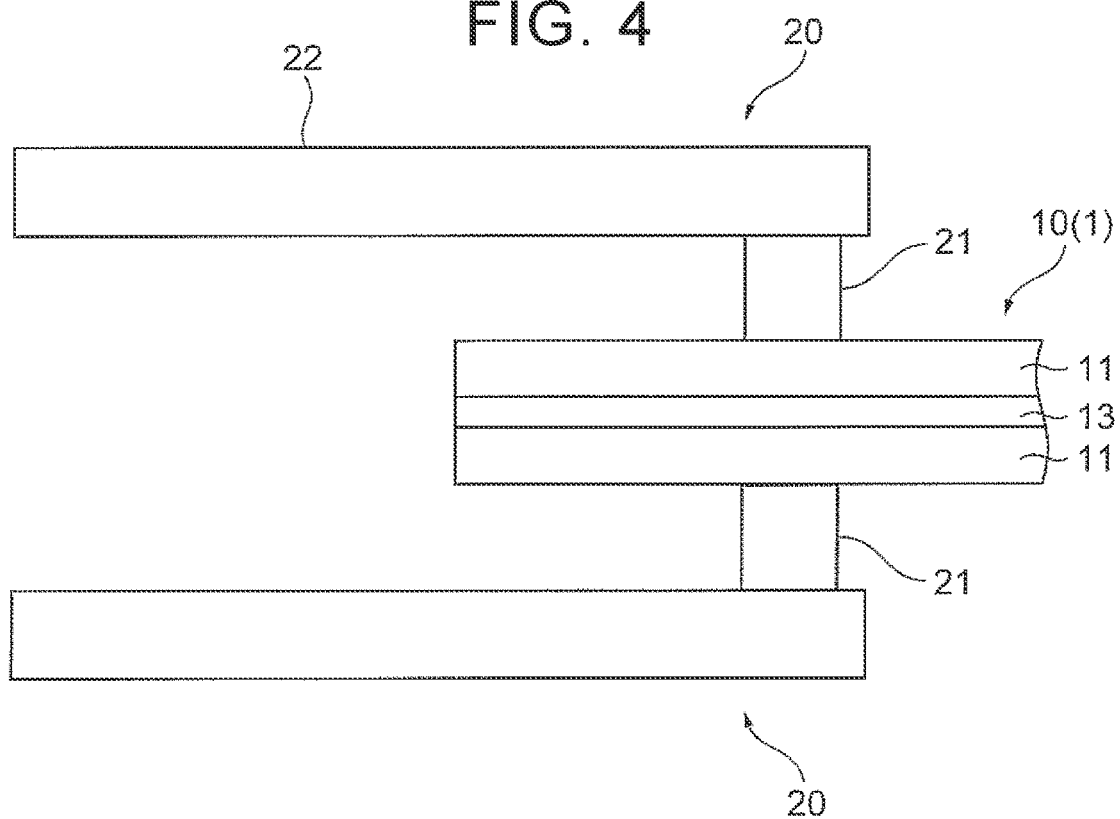
FIG. 4 is an enlarged side view of the laminate and a support portion shown in FIG. 3.

FIG. 2 is a plan view of the laminate 10 in the conveyance step S22 shown in FIG. 1. FIG. 3 is an enlarged plan view of a portion III surrounded by a two-dot chain line in FIG. 2. FIG. 4 is an enlarged side view of the laminate 10 and the support portion 20 shown in FIG. 3.

As shown in FIG. 1, in the manufacturing method for a fuel cell according to the embodiment, each of the support portions 20 having a projecting portion 21 projecting towards the laminate 10 is used in the conveyance step S22 between the heating steps S21, S23 included in the heating adhesion step S2, and the laminate 10 is supported only by the projecting portions 21 and conveyed. Since the laminate 10 is supported only by the projecting portions 21 and conveyed, a contact area between each of the support portions 20 and the laminate 10 is minimized, and transfer of heat of the laminate 10 to the support portion 20 is restrained. Thus, it is possible to restrain a temperature decrease of the laminate 10 in the conveyance step S22.

To be more specific, in the conveyance step S22, the laminate 10 is removed from a heater such as a die in which the heating step S21 is performed, and then the laminate 10 is placed on the projecting portions 21. Each of the projecting portions 21 is provided so as to project towards the laminate 10 from a distal end portion of the lug-shaped support portion 20 provided in the rectangular frame shaped palette 30. Then, in the state where the laminate 10 is supported by the projecting portions 21 provided in the distal end portions of the support portions 20, respectively, the laminate 10 is conveyed to a heater such as a die in which the next heating step S23 is performed.

As shown in FIG. 2, the support portions 20 are disposed at positions facing four corners of the rectangular separator 11 in a planar view. The projecting portions 21 of the support portions 20 support, for example, corner portions of the rectangular separator 11 in a planar view, respectively. When the laminate 10 heated in the heating step S21 is conveyed, the projecting portions 21 of the support portions 20 support the laminate 10 at positions separated from each other as described above. Thus, it is possible to restrain a temperature decrease of the laminate 10. The positions of the laminate 10 at which the laminate 10 is supported by the projecting portions 21 of the support portions 20 are not limited to the four corners of the separator 11. For example, any three points or more in the peripheral edge of the laminate 10 may be supported by three or more of the projecting portions 21 of the support portions 20, respectively.

As shown in FIG. 3 and FIG. 4, each of the support portions 20 has a lug 22 extending along a surface of the separator 11, and the projecting portion 21 projecting towards the surface of the separator 11 from a distal end of the lug 22. The lug 22 has a tapered shape that makes a distal end portion of the lug 22 facing the surface of the separator 11 narrower than a base end portion of the lug 22 positioned outside a peripheral edge of the separator 11. In other words, a sectional area of the lug 22 is reduced gradually from the base end portion towards the distal end portion. Thus, a heat transfer area of the support portion 20 is reduced, and heat of the laminate 10 is hardly transferred to the palette 30 through the support portion 20, thereby restraining a temperature decrease of the laminate 10.

Further, in the example shown in FIG. 3, a wedge-shaped sharp tip portion 22a with a pointed distal end is provided in the most distal end of the lug 22. In the sharp tip portion 22a, the projecting portion 21 having a columnar shape is provided. A central axis of the columnar projecting portion 21 is almost perpendicular to the surface of the separator 11. The shape of the projecting portion 21 is not limited to the columnar shape, and may be an arbitrary shape such as a polygonal columnar shape, a conical shape, and a polygonal pyramid shape. Thus, when the lug 22 of the support portion 20 has the sharp tip portion 22a, the heat transfer area of the support portion 20 is reduced further, thus more effectively restraining a temperature decrease of the laminate 10. As examples of dimensions of the support portion 20, a thickness of the lug 22 is about 5 mm, a diameter of the columnar projecting portion 21 is about 4 mm, and a projection height of the projecting portion 21 is about 4 mm.

For example, a sectional area of the projecting portion 21 may be reduced towards the separator 11. It is preferred that a contact area between a distal end of the projecting portion 21 and the laminate 10 is minimized as much as possible within a range where the projecting portion 21 is able to support the laminate 10. This means that it is preferred that contact between the projecting portion 21 and the laminate 10 is as close to point contact as possible. Thus, it is possible to reduce the heat transfer area between the laminate 10 and the projecting portion 21, thereby restraining a temperature decrease of the laminate 10 more effectively.

In the manufacturing method for a fuel cell according to the embodiment, the palette 30 used in the conveyance step S22 has four pairs of the support portions 20, and the support portions 20 in each pair are disposed above and below the laminate 10 in a vertical direction, respectively. The four pairs of the support portions 20 configure a chuck that sandwiches the laminate 10 from above and below in the vertical direction. Thus, in the conveyance step S22, the laminate 10 is conveyed while being gripped firmly, and displacement of precisely-positioned members of the laminate 10 is thus prevented more reliably.

The palette 30 is not limited to the configuration in which the upper and lower support portions 20 are provided as a pair, and the palette 30 may only have the lower support portion 20 having the projecting portion 21 that supports the laminate 10 from below in the vertical direction. Also, the separator 11 may be provided with depressed portions or holes with which the projecting portions 21 of the support portions 20 are engaged, respectively. Thus, it is possible to reduce the contact area between the support portion 20 and the laminate 10 while preventing displacement of the projecting portion 21 of the support portion 20 with respect to the laminate 10. Thus, a temperature decrease of the laminate 10 is restrained further.

Further, from a viewpoint of restraining a temperature decrease of the laminate 10, the palette 30 may have heating means such as a heater that is used to heat at least the projecting portion 21 of the support portion 20. However, when there is no heating means in the palette 30, the configuration of the palette 30 that conveys the laminate 10 is simplified, and the palette 30 is moved easily. Therefore, productivity of the fuel cell 1 is improved.

A material of the support portion 20 may be, for example, metal such as stainless steel and aluminum. Also, from a viewpoint of restraining a temperature decrease of the laminate 10 by reducing thermal conductivity of the support portion 20, it is preferred that the material of the support portion 20 has low thermal conductivity. Further, from a viewpoint of improving durability and wear resistance of the support portion 20 and preventing contamination and ingress of foreign substances in the fuel cell 1, it is preferred that the material of the support portion 20 has high rigidity, wear resistance, and chemical stability, such as ceramics.

Further, a part of the support portion 20 that comes into contact with the laminate 10 may be coated with a thermal insulation portion that is made of a thermal insulation material such as polyimide with lower thermal conductivity. To be more specific, in the support portion 20, the distal end portion of the projecting portion 21 that comes into contact with the laminate 10 may be coated with the film-shaped thermal insulation portion having thermal conductivity lower than that of the material of the projecting portion 21. A thickness of the thermal insulation portion may be, for example, about 0.15 mm.

The entire projecting portion 21 of the support portion 20, or the entire support portion 20 including the lug 22 and the projecting portion 21 may be coated with the thermal insulation portion. The thermal insulation portion may be formed by, for example, sticking a polyimide film with an adhesion layer to a surface of the support portion 20. Thus, it becomes less likely that heat of the laminate 10 is transferred to the support portion 20, and a temperature decrease of the laminate 10 is restrained more effectively.

As described so far, the heating adhesion step S2 includes the heating steps S21, S23 in which the laminate 10 is heated, and the conveyance step S22 in which the laminate 10 is conveyed between the heating steps S21, S23. When the heating adhesion step S2 is finished, the cooling step S3 is performed as shown in FIG. 1.

For example, in the cooling step S3, temperature of the laminate 10 is decreased to temperature lower than that of the laminate 10 in the heating adhesion step S2 so that the resin frame 13 that is at least partially plasticized in the heating adhesion step S2 is hardened. The cooling step S3 is, for example, a cold press step in which pressing of the peripheral edge of the laminate 10 is performed. In the cooling step S3, temperature of the laminate 10 is decreased to, for example, about 140° C. Thereafter, the laminate 10 is cooled to, for example, room temperature. With the foregoing steps, the fuel cell 1 is manufactured.

As described so far, the manufacturing method for a fuel cell according to the embodiment includes the heating adhesion step S2 in which the laminate 10 is heated, and the separators 11 and the resin frame 13 are adhered to each other. In the laminate 10, the MEGA 12 and the resin frame 13 surrounding the MEGA 12 are disposed between the separators 11. The heating adhesion step S2 includes the heating steps S21, S23 in which the laminate 10 is heated, and the conveyance step S22 in which the laminate 10 is conveyed between the heating steps S21, S23. In the conveyance step S22 of the manufacturing method for a fuel cell according to the embodiment, the support portions 20 having the projecting portions 21 projecting towards the laminate 10 are used, and the laminate 10 is supported only by the projecting portions 21 and conveyed.

As described above, since the heating adhesion step S2 includes the heating steps S21, S23, even when working time for each of the steps included in the manufacturing method for a fuel cell other than the heating adhesion step S2 is shorter than working time for the heating adhesion step S2, working time for each of the heating steps S21, S23 can be made equal to the working time for each of the other steps. Therefore, with the manufacturing method for a fuel cell, it is possible to prevent waiting time in each of the steps other than the heating adhesion step S2.

Further, as described earlier, the manufacturing method for a fuel cell according to the embodiment includes the conveyance step S22 in which the laminate 10 is conveyed between the heating steps S21, S23. Therefore, when the laminate 10 is conveyed in the conveyance step S22 between the heating step S21 and the heating step S23, adhesion failure between the separator 11 and the resin frame 13 due to a temperature decrease of the laminate 10 becomes an issue. In order to address this issue, as described earlier, in the conveyance step S22 of the manufacturing method for a fuel cell according to the embodiment, the support portions 20 respectively having the projecting portions 21 projecting towards the laminate 10 are used, and the laminate 10 is supported only by the projecting portions 21 and conveyed.

Hence, in the conveyance step S22, the support portions 20 that support the laminate 10, and the laminate 10 supported by the support portions 20 are in contact with each other only through the distal ends of the projecting portions 21 that project towards the laminate 10 from the support portions 20, respectively. Therefore, the contact area between each of the support portions 20 and the laminate 10 is minimized so that transfer of heat of the laminate 10 to the support portion 20 is restrained. Thus, it is possible to restrain a temperature decrease of the laminate 10. Hence, it becomes possible to restrain adhesion failure between the separator 11 and the resin frame 13 due to a temperature decrease of the laminate 10.

Also, as described earlier, in the heating adhesion step S2 of the manufacturing method for a fuel cell according to the embodiment, the resin frame 13 is disposed between the separators 11 and heated, the resin frame 13 being made of a resin sheet containing the heat-weldable thermoplastic resin at least on a surface of the resin sheet. Thus, the separator 11 and the resin frame 13 are adhered to each other, and the separators 11 are joined to each other through the resin frame 13. By joining the separators 11 through the resin frame 13, productivity is improved compared to a case where a liquid adhesive is applied to surfaces of the separators 11 so as to join the separators 11 to one another.

As described above, the manufacturing method for a fuel cell, the method including the heating adhesion step S2 in which the separators 11 are joined to each other through the resin frame 13, is especially useful for manufacturing of a fuel cell stack in which the fuel cells 1 are laminated. For example, because the fuel cell stack mounted on a vehicle is manufactured by laminating several hundreds of the fuel cells 1, it becomes important to reduce manufacturing time for each of the fuel cells 1.

This means that the resin frame 13 is simply disposed at a given position on the surface of the separator 11, in comparison to difficulty in evenly applying a liquid adhesive to a given position on the surface of the separator 11. Therefore, with the manufacturing method for a fuel cell according to the embodiment, productivity of the fuel cell 1 is improved compared to the manufacturing method in which a liquid adhesive is applied to the surface of the separator 11.

The embodiment of the disclosure has been described in detail with reference to the drawings. However, a specific configuration is not limited to the embodiment, and the disclosure includes any design change and so on that are made without departing from the gist of the disclosure.

What is claimed is:

1. A manufacturing method for a fuel cell, comprising:
    a heating adhesion step in which a laminate is heated and a pair of separators and a resin frame are adhered to each other, the laminate having the separators, a membrane-electrode-gas diffusion layer assembly, and the resin frame surrounding the membrane-electrode-gas diffusion layer assembly, the membrane-electrode-gas diffusion layer assembly and the resin frame being disposed between the separators, wherein:
        the heating adhesion step has a plurality of heating steps in which the laminate is heated, and a conveyance step in which the laminate is conveyed between the plurality of heating steps; and
        in the conveyance step, a support portion having a projecting portion projecting towards the laminate is used, and the laminate is supported only by the projecting portion and conveyed; and
    a lamination step in which a membrane-electrode-gas diffusion layer assembly and a resin frame surrounding the membrane-electrode-gas diffusion layer assembly are disposed between a pair of separators so as to configure a laminate,
    wherein the heating adhesion step is executed after the lamination step.

2. The manufacturing method according to claim 1, wherein:
    the support portion is provided in a palette that conveys the laminate; and
    the support portion has an extending portion extending in a surface direction of the laminate.

3. The manufacturing method according to claim 2, wherein a sectional area of the extending portion is decreased gradually towards a distal end portion of the extending portion.

4. The manufacturing method according to claim 1, wherein the support portion supports a corner portion of the separator.

5. The manufacturing method according to claim 1, wherein the plurality of heating steps include a first heating step and a second heating step, and the first heating step, the conveyance step, and the second heating step are performed in this order.

6. The manufacturing method according to claim 1, wherein the laminate is sandwiched and conveyed by a projecting portion.

* * * * *